United States Patent [19]

Liou

[11] Patent Number: 5,454,244

[45] Date of Patent: * Oct. 3, 1995

[54] LOCK ASSEMBLY FOR GEARSHIFT STICK OF VEHICLES

[76] Inventor: Gaieter Liou, No. 48, Ton Hwa St., San-min Dist. Kaohsiung, Taiwan

[ * ] Notice: NOTE-DISCLAIMER The portion of the term of this patent subsequent to Jul. 20, 2010 has been disclaimed.

[21] Appl. No.: 201,225

[22] Filed: Feb. 24, 1994

[51] Int. Cl.⁶ .............................. B60R 25/06; E05B 65/12
[52] U.S. Cl. .................................. 70/247; 70/202; 70/203
[58] Field of Search ............................ 70/201, 196, 202, 70/203, 247, 248, 237, 38 A, 39, 423, 424, 455, 453; 403/390, 391, 396, 397, 389

[56] References Cited

U.S. PATENT DOCUMENTS

| | | | |
|---|---|---|---|
| 1,195,808 | 8/1916 | Grgich | 70/423 |
| 1,341,439 | 5/1920 | Powers | 70/423 |
| 1,904,882 | 4/1933 | Prior Jr. | 70/423 |
| 4,077,276 | 3/1978 | Knox, Jr. | 70/203 X |
| 4,345,447 | 8/1982 | Keung et al. | 70/38 A |
| 4,693,099 | 9/1987 | Cykman | 70/202 X |
| 5,189,893 | 3/1993 | Kortenbrede | 70/38 A |
| 5,230,231 | 7/1993 | Liou | 70/38 A |
| 5,295,375 | 3/1994 | Jonas | 70/203 X |

FOREIGN PATENT DOCUMENTS

| | | | |
|---|---|---|---|
| 6421 | 3/1927 | Australia | 70/202 |
| 1388314 | 12/1964 | France | 70/247 |
| 452276 | 10/1949 | Italy | 70/202 |
| 5379 | of 1909 | United Kingdom | 70/423 |
| 2152454 | 8/1985 | United Kingdom | 70/247 |

Primary Examiner—Peter M. Cuomo
Assistant Examiner—Suzanne L. Dino
Attorney, Agent, or Firm—Jacobson, Price, Holman & Stern

[57] ABSTRACT

A lock device for locking a gearshift stick of a vehicle so as to prevent the gearshift stick from being operated includes a base having two holes for receiving two legs of a shackle, two catches slidably received in the base for locking the shackle, and a lock engaged in the base and having two plungers for actuating the catches. A housing is fixed on the base and has two channels for receiving the shackle, two resilient members are disposed in the channels for engaging with the shackle so as to retain the shackle in place. The housing has a key hole access for inserting a key into the key hole of the lock, and a lid is pivotally coupled in the housing for enclosing the key hole access.

3 Claims, 4 Drawing Sheets

LOCK ASSEMBLY FOR GEARSHIFT STICK OF VEHICLES

BACKGROUND OF THE INVENTION

1. Field of the Invention

The present invention relates to a lock assembly, and more particularly to a lock assembly for a gearshift stick of a vehicle.

2. Description of the Prior Art

The closest prior art of which applicant is aware is his prior U.S. Pat. No. 5,228,320 to Liou, entitled "LOCKING ARRANGEMENT FOR THE GEARSHIFT STICK OF VEHICLES", issued on Jul. 20, 1993, the locking arrangement includes a housing provided with two openings formed by two shoulders, two locking plates and two ear plates for engaging with two legs of a shackle of a padlock so as to lock the shackle in place.

The present invention has arisen to provide a novel lock assembly.

SUMMARY OF THE INVENTION

The primary objective of the present invention is to provide a lock assembly which includes a novel configuration.

In accordance with one aspect of the invention, there is provided a lock assembly for a gearshift stick of a vehicle comprising a base including two holes for receiving two legs of a shackle and including a space formed therein and communicated with the holes, a lock engaged in the base and including a core provided therein and having a catch engagement means provided therein, two catches slidably received in the space and extendible inwards of the holes for engaging with the legs of the shackle so as to retain the shackle in place, the catch engagement means, in the form of two plungers being engaged with the catches for actuating the catches toward or away from each other, means for biasing the catches away from each other to engage with the legs of the shackle, a housing fixed on the base and including two channels for receiving the legs of the shackle, two recesses formed in the channels respectively, two plates fixed in the recesses respectively and including resilient members provided therein for engaging with the legs of the shackle so as to retain the shackle in place, two fins extended from the housing for engaging with the shackle for further retaining the shackle in place, the housing including an access to a key hole formed therein and aligned with the core for inserting a key in the key hole, a lid pivotally coupled in the housing for enclosing the key hole access and including a knob extended upward therefrom and extended in the approach for actuating the lid, the housing including a cavity formed therein, and the lid including a projection for engaging with the cavity of the housing so as to retain the lid in place.

Further objectives and advantages of the present invention will become apparent from a careful reading of a detailed description provided hereinbelow, with appropriate reference to accompanying drawings.

DETAILED DESCRIPTION OF THE PREFERRED EMBODIMENT

Figure 1:
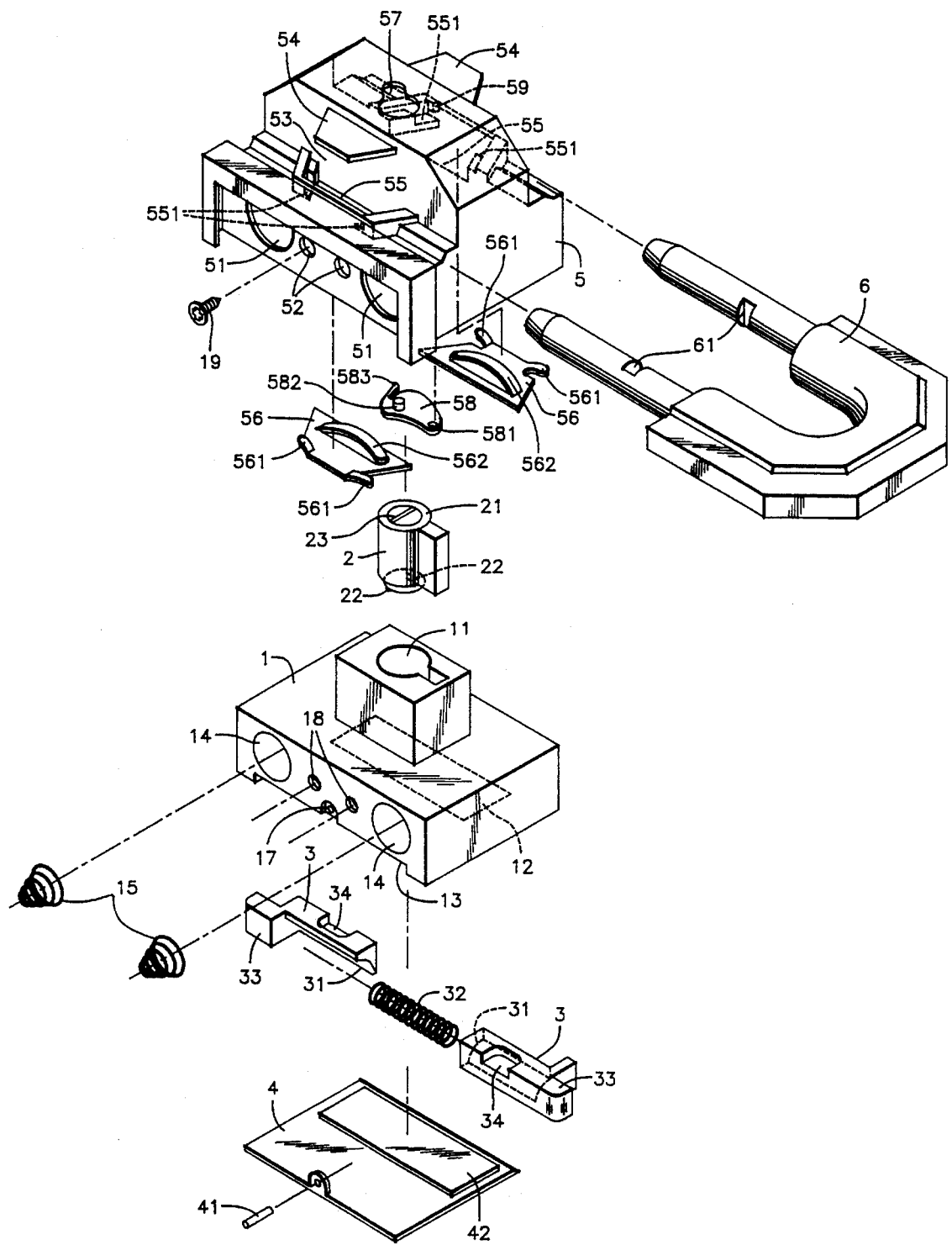
FIG. 1 is an exploded view of a lock assembly in accordance with the present invention.
Figure 2:
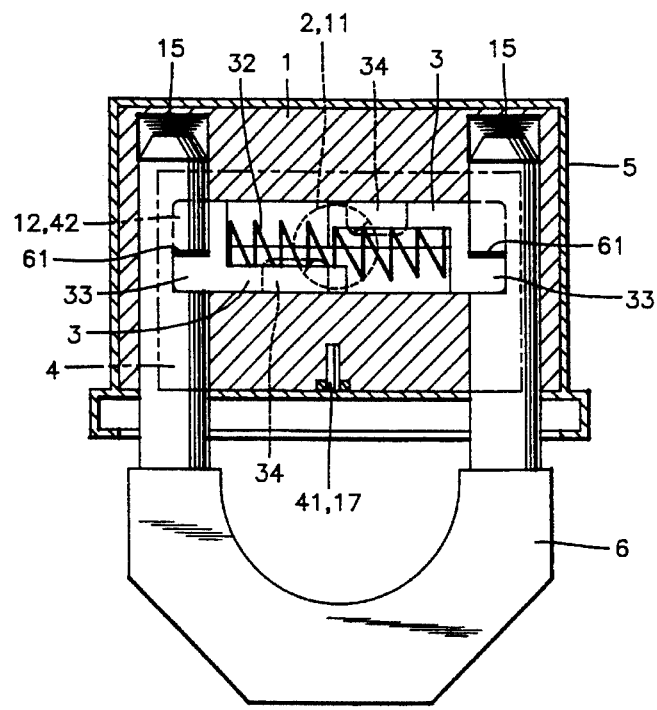
FIG. 2 is a cross-sectional view illustrating the shackle in a locked position.
Figure 3:
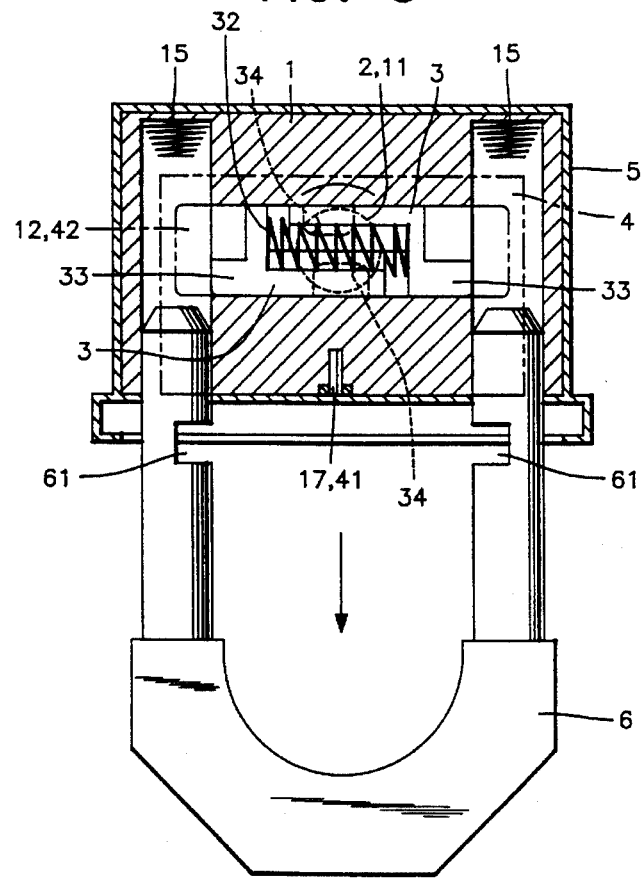
FIG. 3 is a cross-sectional view of the shackle being removed from the lock assembly.

Referring to the drawings, and initially to FIGS. 1 to 3, a lock assembly in accordance with the present invention comprises a base 1 including an opening 11 provided in the upper portion for receiving a lock 2, a space 12 formed therein for receiving two catches 3, an open bottom 13 enclosed by a cap 4 which is fixed to the base 1 by a pin element 41 and which includes a lump 42 engaged in the space 12 for retaining the catches 3 in place, the pin element 41 is engaged in the hole 17 formed in the base 1, two holes 14 formed in the base 1 for receiving two legs of a shackle 6 and communicated with the space 12, a spring 15 fixed in each of the holes 14 for biasing the legs of the shackle 6, and two screw holes 18 formed in the base. The lock 2 includes a core 21 having a key hole 23 formed in the upper portion and having two plungers 22 extended downward therefrom for engaging with the catches 3, the catches 3 are slidably engaged in the space 12 and include two ends 33 extendible inwards of the holes 14 respectively for engaging with the notches 61 of the shackle 6, the catches 3 further includes an opening 31 for receiving a spring 32 which biases the catches 3 away from each other to engage with the shackle 6, and each of the catches 3 includes a depression 34 formed in the upper portion for engaging with the plungers 22 such that the catches 3 can be actuated by the lock 2.

A housing 5 is engaged on the base 1 and includes two orifices 51 aligned with the holes 14 of the base 1 for engaging with the legs of the shackle 6, two apertures 52 aligned with the screw holes 18 for engaging with screws 19 which fix the housing 5 to the base 1, a pair of channels 53 for engaging with the legs of the shackle 6, a pair of fins 54 provided above the channels 53 for engaging with and for retaining the shackle in place, a recess 55 formed in the bottom portion of each of the channels 53 and including two shoulders 551 for engaging with a plate 56, the plate 56 includes two hooks 561 for fixing the plate 56 in the recess 55 and includes a resilient member 562 extended upward therefrom for engaging with the shackle 6, best shown in FIGS. 4 to 7. The house 5 includes a key hole access 57 formed in top and aligned with the core 21 of the lock 2 such that the key may be inserted into the key hole 23 to engage with the core 21, a lid 58 includes a hole 581 rotatably engaging with a stub 59 extended in the housing 5 for enclosing the key hole access 57, a knob 582 extended upward from the lid 58 and engaged in the key hole access 57 such that the lid 58 can be operated with the knob 582, the lid 58 includes a projection 583 for engaging with two cavities 50 formed in the housing 5 for retaining the lid 58 in place, best shown in FIGS. 4 and 5.

Figure 4:
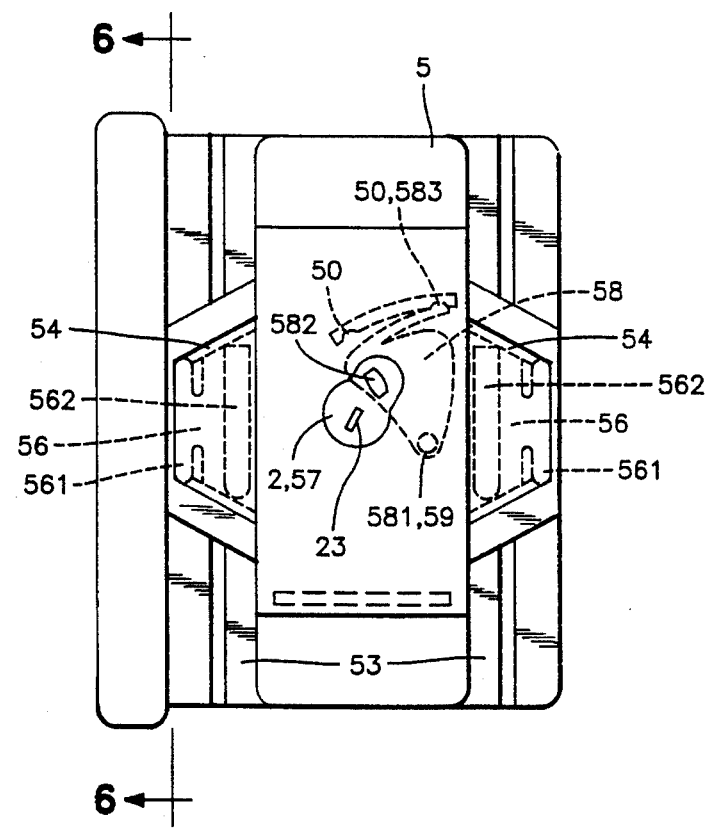
FIG. 4 is a top plan view showing the lid of the key hole in an open condition.
Figure 5:
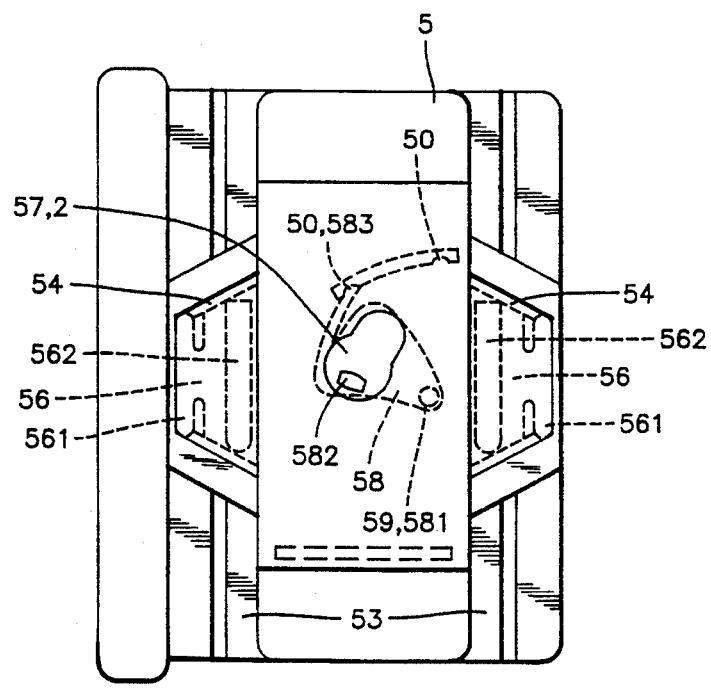
FIG. 5 is a top plan view of the lock assembly showing the lid of the key hole in a closed condition.
Figure 6:
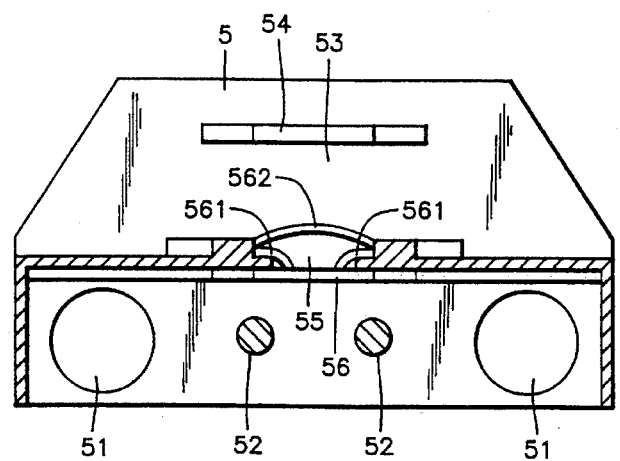
FIG. 6 is a cross sectional view taken along lines 6—6 of FIG. 4.
Figure 7:
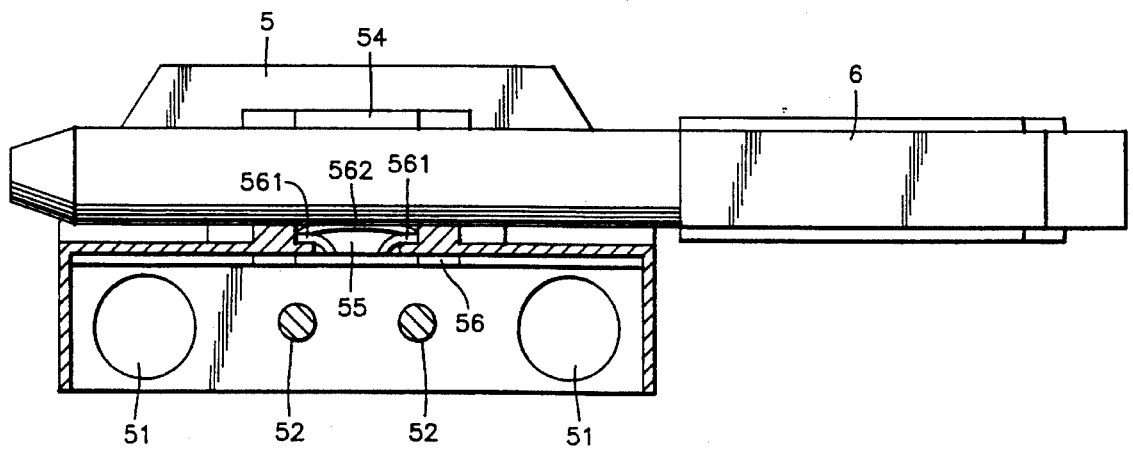
FIG. 7 is a cross sectional view similar to FIG. 6, in which a shackle is engaged in the lock assembly.

In operation, as shown in FIG. 2, the ends 33 of the catches 3 are biased to engage with the notches 61 of the shackle 6 so as to lock the shackle in place. As shown in FIG. 3, the catches 3 are moved toward each other when the core 21 is rotated by a key such that the catches 3 can be disengaged from the notches 61 so as to release the shackle 6. As shown in FIGS. 4 and 5, the approach 57 can be enclosed by the lid 58, and as shown in FIGS. 6 and 7, the shackle 6 can be stably retained in place by the resilient members 562.

Accordingly, the lock assembly in accordance with the present invention includes a novel configuration.

Although this invention has been described with a certain degree of particularity, it is to be understood that the present disclosure has been made by way of example only and that numerous changes in the detailed construction and the combination and arrangement of parts may be resorted to without departing from the spirit and scope of the invention as hereinafter claimed.

I claim:

1. A lock assembly for a gearshift stick of a vehicle comprising a base having two holes for receiving two legs of a shackle and including a space formed therein and communicating with said holes; a lock located within said base and including a core having a longitudinal axis with catch engagement means extending outwardly therefrom, said core being rotatable about said longitudinal axis; two catches slidably received in said space and extendible inwards of said holes; a means for biasing said catches away from each other to engage said catches with said legs of said shackle to retain said shackle in place, and wherein said catch engagement means being adapted to actuate said catches toward or away from each other; a housing fixed on said base and having two channels adapted to receive said legs of said shackle, a recess formed in each of said channels respectively, a plate fixed in each of said recesses respectively, each of said plates having an upwardly biased member adapted to engage with each of said legs of said shackle and two fins extending from said housing for engaging with said shackle and which together with said biasing members are capable of retaining said shackle in place; said housing having a keyhole access formed therein and aligned with said core; a lid pivotally coupled in said housing for closing said keyhole access and having a lid actuating means upwardly extending therefrom and in said keyhole access and at least one cavity formed therein, adapted to engage with a lid projection to retain said lid in place.

2. The lock assembly of claim 1, wherein said lid actuating means is a knob.

3. The lock assembly of claim 1, wherein said catch engagement means comprises two plungers.

* * * * *